(12) United States Patent
Lee et al.

(10) Patent No.: US 6,674,404 B1
(45) Date of Patent: Jan. 6, 2004

(54) APPARATUS AND METHOD FOR DETECTING AND CORRECTING DEFECTIVE PIXELS IN IMAGE SENSOR

(75) Inventors: Suk-Joong Lee, Ichon-shi (KR); Sang-Yeon Kim, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/474,004

(22) Filed: Dec. 28, 1999

(30) Foreign Application Priority Data

Dec. 30, 1998 (KR) ........................................ 1998-61042

(51) Int. Cl.[7] .............................................. G06K 9/40
(52) U.S. Cl. ........................ 343/275; 382/312; 382/318
(58) Field of Search ................................ 382/275, 151, 382/291, 289, 318, 312; 273/237; 341/26; 348/247, 94; 356/394, 399; 716/19

(56) References Cited

U.S. PATENT DOCUMENTS 4,235,442 A * 11/1980 Nelson ........................ 273/237
4,858,013 A    8/1989 Matsuda

FOREIGN PATENT DOCUMENTS

EP        02071682       3/1990     .......... H04N/5/335
EP        0561599 A2     3/1993     .......... H04N/5/217

* cited by examiner

Primary Examiner—Anh Hong Do
(74) Attorney, Agent, or Firm—Jacobson Holman PLLC

(57) ABSTRACT

A method for detecting and correcting a defective pixel in an image sensor including an M(row line)×N(column line) unit pixels, M and N being positive integers, includes a first step of electrically scanning photoelectric charges generated from unit pixels of a first row line for a first integration time and storing a first data corresponding to the photoelectric charges, a second step of electrically scanning photoelectric charges generated from the unit pixels of the first row line for a second integration time and storing a second data corresponding to the photoelectric charges, a third step of comparing the first data and the second data one another, if the first data is different from the second data, an error signal is generated and then a corresponding address of the unit pixel is stored as a defective pixel address, a fourth step of repeating the first to the third step to an Mth line by increasing an address by one, and a fifth step of comparing an address of a unit pixel to be read with the defective pixel address, if the address of the unit pixel is equal to the defective pixel address, a correction operation is performed to generated a corrected data.

14 Claims, 5 Drawing Sheets

APPARATUS AND METHOD FOR DETECTING AND CORRECTING DEFECTIVE PIXELS IN IMAGE SENSOR

FIELD OF THE INVENTION

The present invention relates to an image sensor; and, more particularly, to an apparatus and method for detecting and correcting defective pixels in an image sensor.

DESCRIPTION OF THE PRIOR ART

Generally, an image sensor is an apparatus to capture images using light sensing semiconductor materials. Since brightness and wavelength of light from an object are different in their amount according to the reflection area, electrical signals from pixels are different from each other. These electrical signals are converted into digital signals, which can be processed in a digital circuit, by an analog-to-digital converter. Thus, the image sensor needs a pixel array having a plurality of pixels, an analog-to-digital converter for converting analog voltage signals outputted from the pixel array into a digital voltage signals, a plurality of storage devices and so on.

Since the image sensor needs a plurality of devices such as pixels, converters and so on, a possibility of defects therein may always exist in fabricating the image sensor. The defects may occur in a form of spots and lines on a displaying device. Furthermore, if the image sensors having partial defects are considered as a device failure, yield may be dramatically reduced.

SUMMARY OF THE INVENTION

It is, therefore, an object of the present invention to provide an apparatus and method for detecting and correcting defective pixels in an image sensor, thereby improving yield of the device.

In accordance with an aspect of the present invention, there is provided a method for detecting and correcting a defective pixel in an image sensor including an M(row line)×N(column line) unit pixels, the method comprising the steps of: a) electrically scanning photoelectric charges generated from unit pixels of a first row line for a first integration time and storing a first data corresponding to the photoelectric charges; b) electrically scanning photoelectric charges generated from the unit pixels of the first row line for a second integration time and storing a second data corresponding to the photoelectric charges; c) comparing the first data and the second data one another, if the first data is different from the second data, an error signal is generated and then a corresponding address of the unit pixel is stored as a defective pixel address; d) repeating the step a) to the step c) to an Mth line by increasing an address by one; e) comparing an address of a unit pixel to be read with the defective pixel address, if the address of the unit pixel is equal to the defective pixel address, a correction operation is performed to generated a corrected data.

In accordance with another aspect of the present invention, there is provided an apparatus for detecting and correcting a defective pixel in an image sensor having a pixel array, wherein the pixel array includes an M(row line)×N(column line) unit pixels, comprising: unit pixels, driven by an integration address and a scan address, for receiving a first and second integration time and a critical value in response to an enable signal at a defective pixel detection mode to generate a first data and a second data from respective unit pixels corresponding to the integration address and the scan address according to the first and second integration time, respectively; a defective pixel detection means for comparing a critical value with a difference between a first data and a second data to generate an error signal in case where the difference is smaller than the critical value, and to output the integration address, the scan address and the column address of corresponding unit pixel; a defective pixel address storage means for storing the defective pixel address in response to the error signal and comparing the integration address, the scan address and the column address with the defective pixel address to generate a defective pixel defection signal; and a defective pixel correction means for correcting the first data and the second data of the defective pixel in response to the defective pixel detection signal to generate a first corrected data and a second corrected data, respectively.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
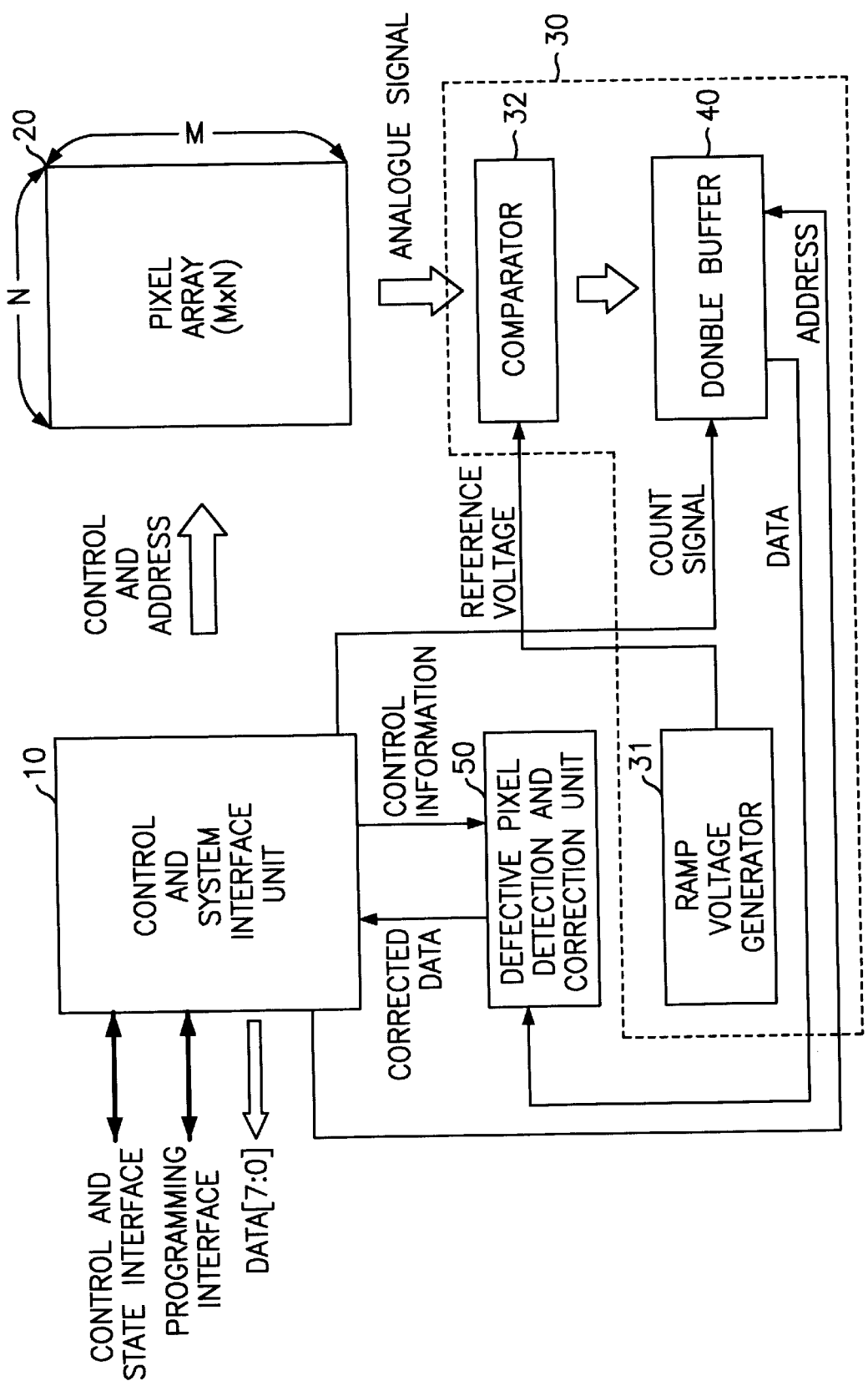
FIG. 1 is a block diagram illustrating a CMOS image sensor having a defective pixel detection and correction unit according to the present invention.

FIG. 1 is a block diagram illustrating a CMOS image sensor having a defective pixel detection and correction unit according to an embodiment of the present invention.

Referring to FIG. 1, a CMOS image sensor according to the present invention includes a control and system interface unit 10 for controlling the image sensor and acting as an interface with an external system. A pixel array 20 having M×N pixels converts photoelectric charges corresponding to a captured image into an analog signal. A converter 30 converts the analog signal from the pixel array 20 into digital signal. A ramp voltage generator 31 generates a reference voltage that is linearly decreased according to clocks, a comparator 32 compares the reference voltage with the analog signal from the pixel array 20 and output a write enable signal, and a double buffer 40 stores the digitized image values in response to the write enable signal from the comparator 32. Furthermore, the CMOS image sensor includes a defective pixel detection and correction unit 50 for detecting a defective pixel and outputting corrected data to the control and system interface unit 10 in response to a control signal.

In an entire operation of the CMOS image sensor, a batch register is programmed through a programming interface by an external system in order to instruct the image sensor to perform a wanted operation. According to the programmed instruction, the control and system interface unit 10 drives the pixel array 20, so that respective pixel values are read out line by line.

Figure 2:
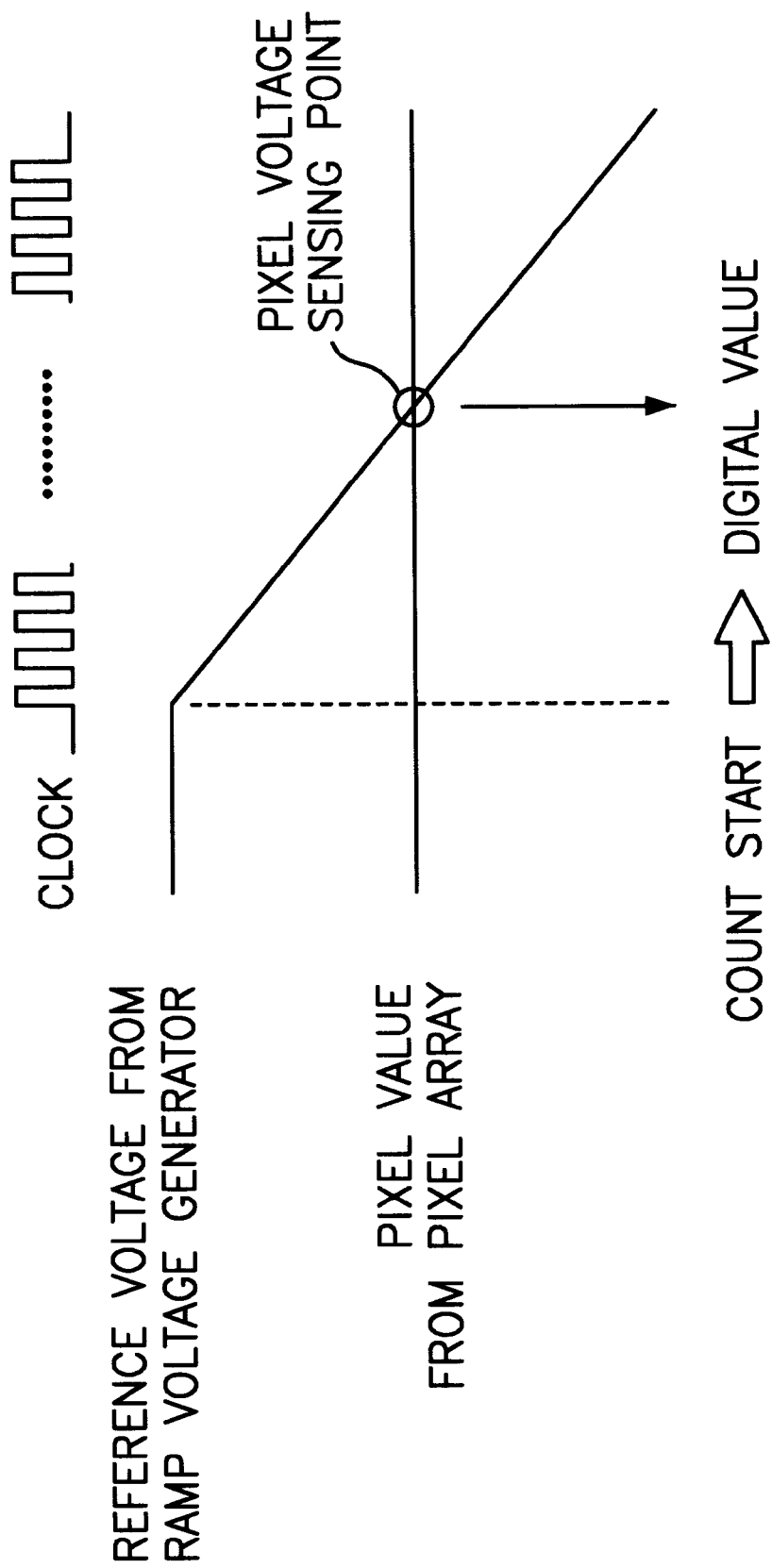
FIG. 2 is a diagram explaining an operation of a comparator and a double buffer shown in FIG. 1.

FIG. 2 is a diagram for explaining an operation of the comparator and the double buffer. Referring to FIG. 2, the comparator 32 compares the pixel value from the pixel array 20 with the reference voltage from the ramp voltage generator 31 and the resulting signal is used as a write enable signal of the double buffer 40. That is, if the reference voltage is higher than the pixel value as an output of the pixel array, the write enable signal is enabled and a counter value from the control and system interface unit 10 is written to the double buffer 40. Next, the reference voltage is decreased by a predetermined level and the decreased reference voltage is again compared with the pixel value. By repeating such a process in every clock, the write enable signal is disabled at a period when the reference voltage is smaller than the pixel value, thereby resulting in the stopping of the write operation of the double buffer 40. A count value, which is written to the double buffer 40 just before the write enable signal is disabled, is a digitized value corresponding to the pixel value from the pixel array 20.

At this time, in order to achieve an operation to convert the analog signal into the digitized signal by way of a pipeline method, the double buffer 40 is needed.

Additionally, the defective pixel detection and correction unit 50 receives data that is stored in the double buffer 40, and properly corrects the data according to a value of defective detection register and an output mode value in the control and system interface unit 10. Then, the data is transferred to the control and system interface unit 10 and is outputted to an external system according to an output mode.

Figure 3:
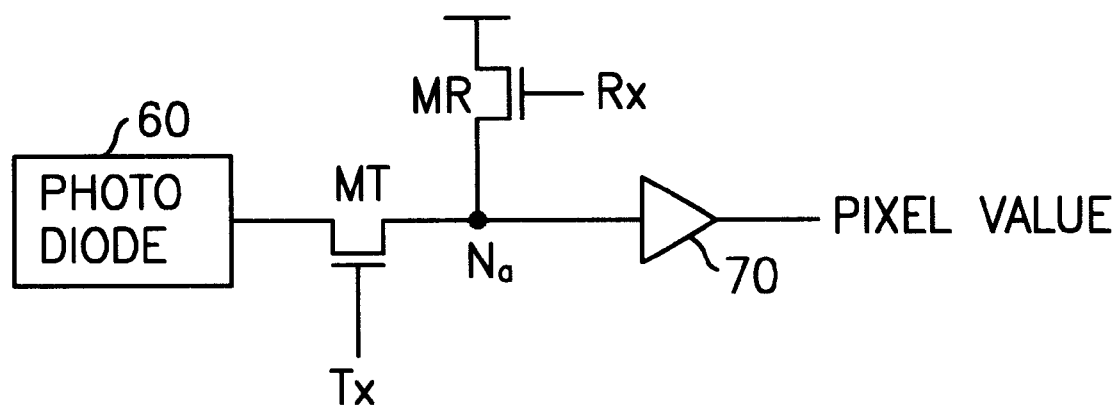
FIG. 3 is a schematic diagram of a unit pixel.

FIG. 3 is a schematic diagram of unit pixel contained in the pixel array. Referring to FIG. 3, the unit pixel includes a photodiode 60 for generating photoelectric charges, a transfer transistor MT, in response to a transfer control signal. Tx, for transferring the photoelectric charges to a sensing node $N_a$, a reset transistor MR, in response to a reset control signal Rx, for resetting the photodiode 60 and transferring a reset voltage level to the sensing node $N_a$ for an operation of correlated double sampling (CDS) and a buffer 70 for outputting a voltage level of the sensing node $N_a$ as a pixel value.

An operation of the unit pixel will be described with reference to FIG. 3.

First, the photodiode 60 is initialized by setting the reset control signal Rx and the transfer control signal Tx to a high level. Next, the transfer transistor MT is turned off, so that the photoelectric charges are generated in the photodiode 60. Then, the transfer transistor MT is turned on and the pixel value corresponding to the photoelectric charges is read out through the buffer 70.

At this time, the number of the photoelectric charges is proportional to the number of the inputted photons and a time period during when the transfer transistor MT is kept on a turned-off state. Therefore, in case where an image is captured in a dark place, the transfer transistor MT should be kept on a turned-off state for a long time, but in case where an image is captured in a bright place, the transfer transistor MT should be kept on a turned-off state for a short time. At this time, the time period when the transfer transistor MT is kept on the turned-off state is called an exposure time or an integration time.

Meanwhile, using an integration address and a scan address which are similar to a low address in the image sensor, the pixel array 20 is accessed line by line and the accessed data are stored in the double buffer 40. Then, respective data are outputted as a pixel value in response to a column address. Here, the transfer transistor MT is turned off in respect to the integration address, so that the photodiode 60 starts to generate the photoelectric charges. Also, the position of respective unit pixels can be determined through the scan address and the column address.

In case of a normal pixel, respective pixel value may be different because of a difference of the number of the photoelectric charges according to the integration time. On the other hand, in case of a defective pixel, a difference of the exposure time does not result in a difference of pixel value. The defective pixel detection and correction unit 50 detects a defective pixel by differently applying an integration time.

Figure 4:
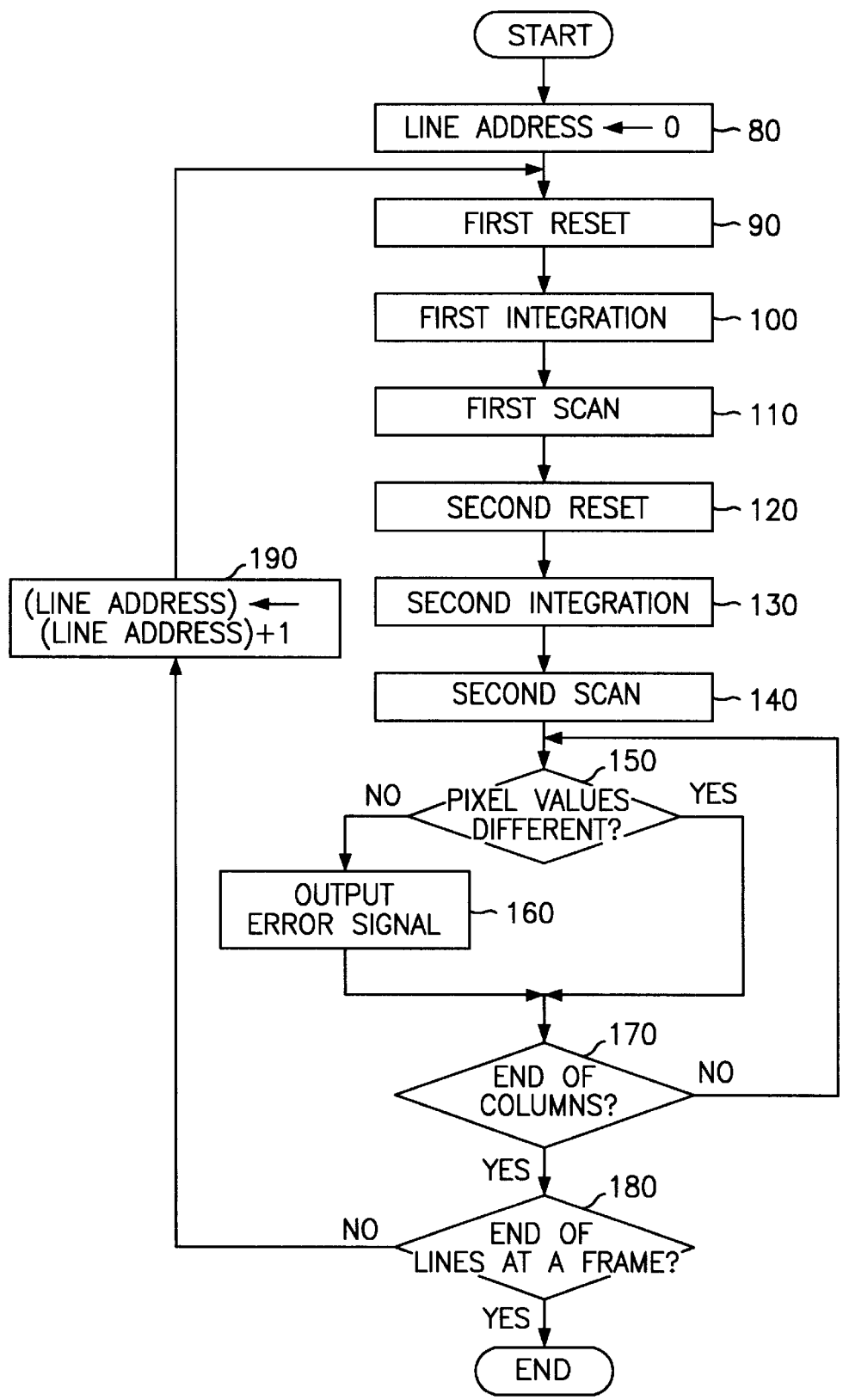
FIG. 4 is a flow chart of a method for detecting a defective pixel in a defective pixel detection and correction unit shown in FIG. 1.

FIG. 4 is a flow chart showing a method for detecting a defective pixel according to the present invention.

At a step 80, a defect detection starts with respect to unit pixels corresponding to a line address 0 of the pixel array 20. At a step 90, a first reset operation is performed by turning on the reset transistor MR and the transfer transistor MT of unit pixels on a first line. At a step 100, the photodiode 60 generates the photoelectric charges for a first integration time by turning off the transfer transistor MT. At a step 110, the generated photoelectric charges are electrically scanned and then the first scanned data is stored in one of the double buffer 40.

Next, at a step 120, a second reset operation is performed by turning on the reset transistor MR and the transfer transistor MT of unit pixels on the first line. At a step 130, the photodiode 60 generates the photoelectric charges for a second integration time which is longer than the first exposure time. At a step 140, the generated photoelectric charges are electrically scanned and then the second scanned data is stored in the other of the double buffer 40.

Next, at step 150, the first scanned data is compared with the second scanned data. As a result, in case where there is a difference between the first and the second scanned data, that pixel is considered as a normal pixel, so that next step 170 is processed. However, at a step 160, in case where there is not a difference between them, the corresponding pixel is considered as a defective pixel and an error signal is outputted.

Next, at a step 170, a check is made as to whether a current column is an end of columns at the first line or not. In case where the current column is not an end of columns, the step 150 is repeated, so that pixel values of a next unit pixel are compared. However, at a step 180, in case where the current column is an end of columns, a check is made as to whether the current line is an end of lines at the current frame. In case where the current line is an end line, an operation for detecting defective pixels is stopped. However, at a step 190, the current line is not an end line, the line address is increased by one, and then the steps from the step 90 to the step 170 are repeated.

Figure 5:
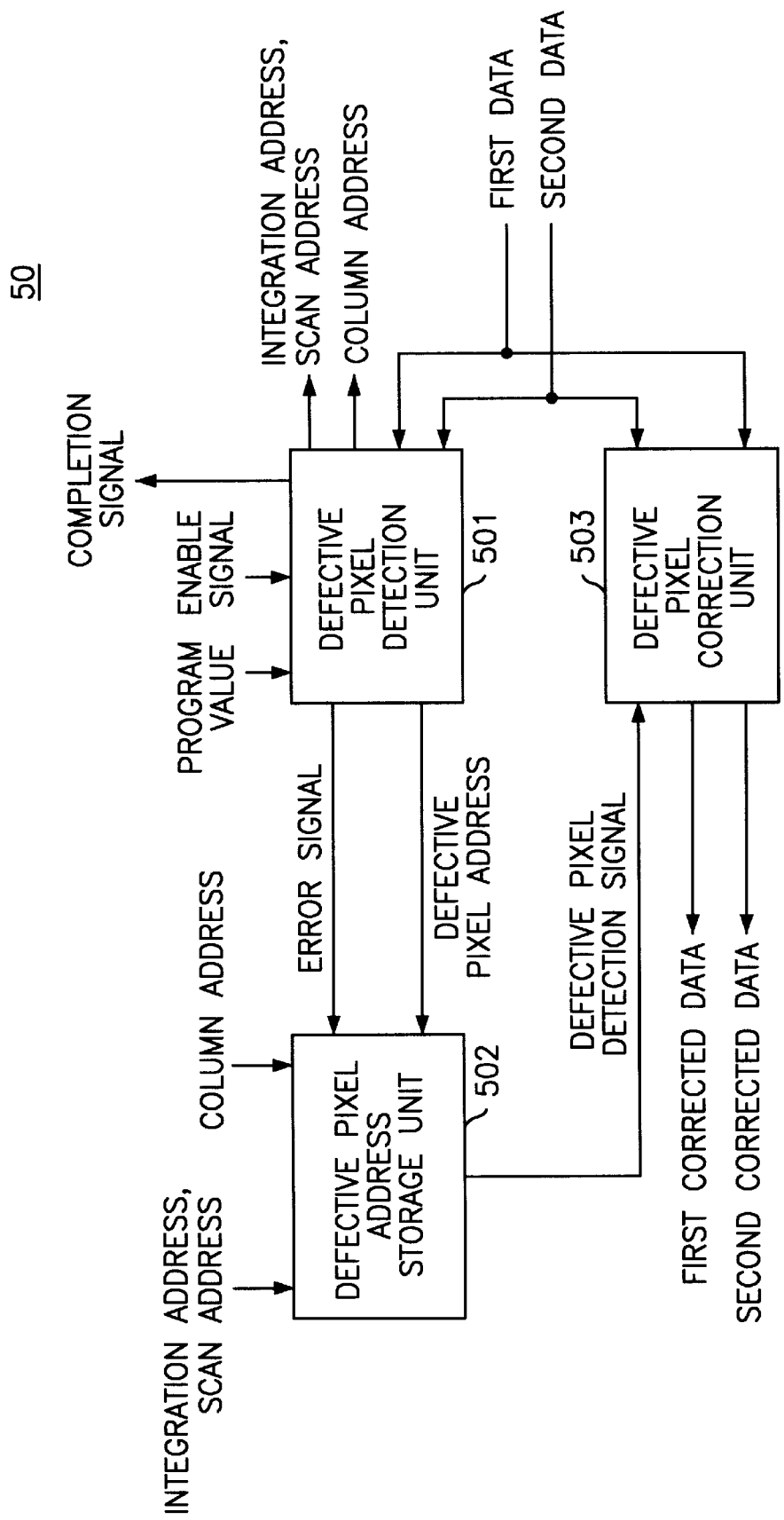
FIG. 5 is a block diagram of a defective pixel detection and correction unit shown in FIG. 1 according to the present invention.

FIG. 5 shows a block diagram of the defective pixel detection and correction unit shown in FIG. 1.

Referring to FIG. 5, the defective pixel detection and correction unit 50 includes a defective pixel detection unit 501, a defective address storage unit 502 of a CAM (content addressable memory) type and a defective pixel correction unit 503.

At a defective pixel detection mode, the pixel array 20 receives a first and second integration time and a critical value in response to an enable signal used for a defective pixel detection and is driven by an integration address, a scan address and a column address. At this time, the first and second integration and the critical value can be programmed by a user. As a result, a first data and a second data are outputted from a unit pixel corresponding to the integration address and scan address according to the first and second integration time, respectively.

Then, the defective pixel detection unit 501 compares the critical value with a difference between the first data and the second data. At this time, in case where the difference is smaller than the critical value, the defective pixel detection unit 501 generates an error signal and outputs the integration address and the scan address and the column address of the corresponding defective pixel as a defective pixel address to the defective pixel address storage unit 502.

The defective pixel address storage unit 502 stores the defective pixel address in response to the error signal and compares the integration address, the scan address and the column address, which are inputted at a normal mode, with the defective pixel address to generate a defective pixel defection signal.

The defective pixel correction unit 503 corrects the first and second data of the defective pixel in response to the defective pixel detection signal to generate a first corrected data and a second corrected data, respectively. That is, in case where a defective unit pixel detected, the defective pixel correction unit 503 generates pixel values of a previous unit pixel as the first and second corrected data.

After completing an operation of the defective pixel detection, the defective pixel detection unit 501 generates a completion signal to the control and system interface unit 10. At this time, in case of the CDS (correlated double sampling method), the first and second data inputted into the defective pixel correction unit 503 corresponds to the reference data and the actual data, respectively.

While the present invention has been described with respect to certain preferred embodiments only, other modifications and variation may be made without departing from the spirit and scope of the present invention as set forth in the following claims.

What is claimed is:

1. A method for detecting and correcting a defective pixel in an image sensor including an M(row line)×N(column line) unit pixels, M and N being positive integers, the method comprising the steps of:

a) electrically scanning photoelectric charges generated from unit pixels of a first row line for a first integration time and storing a first data corresponding to the photoelectric charges;

b) electrically scanning photoelectric charges generated from the unit pixels of the first row line for a second integration time and storing a second data corresponding to the photoelectric charges;

c) comparing the first data and the second data one another, if the first data is different from the second data, an error signal is generated and then a corresponding address of the unit pixel is stored as a defective pixel address;

d) repeating the step a) to the step c) to an Mth line by increasing an address by one;

e) comparing an address of a unit pixel to be read with the defective pixel address, if the address of the unit pixel is equal to the defective pixel address, a correction operation is performed to generate a corrected data.

2. The method as recited in claim 1, wherein each of the unit pixels includes:

a light sensing means for sensing an image and generating photoelectric charges;

an amplifying means for amplifying the input signal to output an amplified signal;

a first switching means for transferring the photoelectric charges from the light sensing means as the input signal to the amplifying means;

a second switching means for transferring a reset voltage level from a voltage source to the light sensing means and the amplification means; and a third switching means for outputting the amplified signal and the reset voltage level as unit pixel output signals.

3. The method as recited in claim 2, wherein the step a) includes the steps of:

a1) turning on the first switching means and the second switching means on the first row line, so that a first reset operation is performed;

a2) turning off the first switching means for the first integration time, thereby generating photoelectric charges; and a3) turning on the first switching means and turning off the second switching means, so that the first data is scanned and stored.

4. The method as recited in claim 3, wherein the step b) includes the steps of:

b1) turning on the first and second switching means on the first row line;

b2) turning off the first switching means for the second integration time, thereby generating photoelectric charges; and b3) turning on the first switching means and turning off the second switching means, so that the second data is scanned and stored.

5. The method as recited in claim 1, wherein the second integration time is longer than the first integration time.

6. The method as recited in claim 1, wherein the first integration time is longer than the second integration time.

7. The method as recited in claim 2, wherein the light sensing element is a photodiode.

8. The method as recited in claim 7, wherein the first switching means is an NMOS transistor.

9. The method as recited in claim 8, wherein the second switching means is an NMOS transistor.

10. The method as recited in claim 9, wherein the third switching means is an NMOS transistor.

11. The method as recited in claim 10, wherein the amplifying means is an NMOS transistor.

12. An apparatus for detecting and correcting a defective pixel in an image sensor having a pixel array, wherein the pixel array includes an M(row line)×N(column line) unit pixels, comprising:

unit pixels, driven by an integration address and a scan address, for receiving a first and second integration time and a critical value in response to an enable signal at a defective pixel detection mode to generate a first data and a second data from respective unit pixels corresponding to the integration address and the scan address according to the first and second integration time, respectively;

a defective pixel detection means for comparing the critical value with a difference between a first data and a second data to generate an error signal in case where the difference is smaller than the critical value, and to output the integration address, the scan address and the column address of corresponding unit pixel;

a defective pixel address storage means for storing the defective pixel address in response to the error signal and comparing the integration address, the scan address and the column address with the defective pixel address to generate a defective pixel detection signal; and a defective pixel correction means for correcting the first data and the second data of the defective pixel in response to the defective pixel detection signal to generate a first corrected data and a second corrected data, respectively.

13. The apparatus as recited in claim 12, wherein the defective pixel address storage means is a content addressable memory.

14. The apparatus as recited in claim 12, wherein the first and second corrected data are pixel values of a previous unit pixel.

* * * * *